Jan. 26, 1960  L. S. KOHN ET AL  2,922,734
FABRICATION OF ELECTRICAL WINDINGS
Filed April 13, 1956
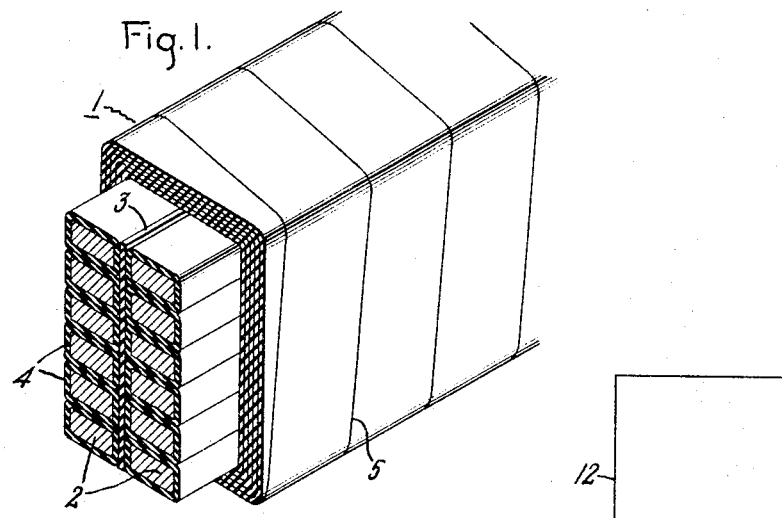
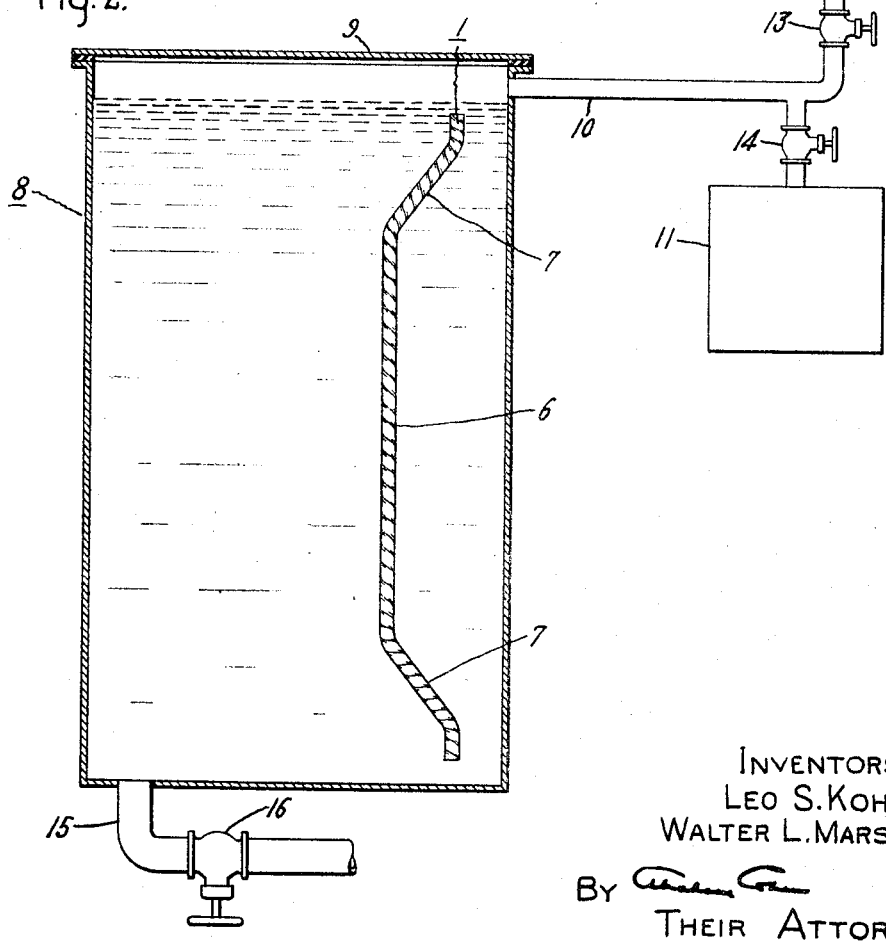
INVENTORS
LEO S. KOHN
WALTER L. MARSHALL
BY
THEIR ATTORNEY United States Patent Office 2,922,734
Patented Jan. 26, 1960

2,922,734

FABRICATION OF ELECTRICAL WINDINGS

Leo S. Kohn and Walter L. Marshall, Schenectady, N.Y., assignors to General Electric Company, a corporation of New York Application April 13, 1956, Serial No. 578,059

4 Claims. (Cl. 154—80)

Our invention relates to the fabrication of electrical windings for electrodynamic machines. More particularly, it relates to the molding together of the structural parts of an electrical winding along with its associated insulation to provide a compact, uniform, mechanically strong, well insulated winding of any desired preformed shape.

Windings for electrodynamic machinery are generally constructed of a plurality of conductor turns insulated from each other by a suitable dielectric material with an outer covering of insulation around the entire winding. For machines of higher rating, the windings are prefabricated and then placed in mating slots in the machine, and it is obvious that the size and shape of the winding must meet close tolerances for reception in the slot and that the ends of the winding or half coil be accurately shaped for proper connection with another winding to form a coil.

According to one method of fabricating such windings, the individually shaped conductors or straps coated with a thermosetting insulating material are mounted in tiers with insulating tier separators where required. Alternatively the conductor turns may be insulated with tape of various well known types which in some instances may be impregnated or treated with a thermosetting resin. The conductor array is normally wrapped with one or more layers of insulating tape or sheet material which in some cases is impregnated with a thermosetting material, or may in and of itself be a thermosetting material. A protective sacrifice tape which is typically of cotton, glass fiber, film or other suitable material is wrapped over the insulating tape. The straight central or slot portion of the winding is then placed in a suitable press and cured and molded under heat and pressure with the thermosetting material converted to a substantially infusible and insoluble state. In order to cure and mold the odd-shaped end portions, the entire winding is exposed to a vacuum which effectively removes any residual vaporous material therein. The winding is then surrounded with a hot fluid under pressure, the pressure serving to compress the winding structure tightly together and the heat serving to cure the thermosetting insulating material to make a winding structure in which the individual conductors are bound together in an insulated manner and the whole provided with a unitary outer insulation. The winding after cure is removed from the liquid and the sacrifice tape stripped therefrom to provide either a finished product or one to which additional layers of outer insulation may be applied and cured in the above manner.

Normally, the hydraulic fluid used is an asphalt or bitumen composition although it may be a hydrocarbon oil, a liquid resinous material as of the cumarone-indene type, etc., but the composition of the liquid is not necessarily limited to those listed above. The hydraulic curing fluid passes through the sacrifice tape during the curing cycle and mixes with the thermosetting insulating material causing it to cure improperly or even displacing part of the insulation. The net result is a non-homogeneous poorly bonded and insulated winding and, when the liquid displaces a part of the insulation, bleeding loss of insulation and the formation of gas pockets occur during use. In an effort to overcome the damage caused by seepage of the heated and pressurized liquid into the winding structure, resin impregnated, coated or film-like sacrifice tapes have been used. However, here, even though the tape surface may be impervious to liquid the latter seeps underneath the edges of the tape where it is overlapped and enters the winding. In other cases the sacrifice tape has been coated with a solution of a resin which is sprayed or painted thereon after it has been wrapped about the winding. An example of such a resinous material is a water solution of carboxymethyl cellulose and another which has been used in cellulose acetate in an organic solvent. In such cases, the resin solution is either dried at room temperature or heated to drive off the solvent. However, it has been found that a certain portion of the solvent, water, organic or otherwise, again enters the winding structure with detrimental results. In actual practice, none of the above methods has been found practical or economical in protecting the winding from the hydraulic fluid.

It has also been proposed that instead of molding such windings submerged in a heated and pressurized liquid they be molded in special molding presses. However the economics of making a special mold to receive an electrical winding of odd longitudinal shape up to twenty and more feet in length militates against such a procedure. It has also been proposed to mold the straight center or slot portion of the winding as above in a conventional mold or clamp and to mold the differently shaped end portions in an incremental or stepwise fashion in smaller clamps or molds. The disadvantages of such a procedure will at once be apparent. Besides the time consuming procedure involved, the winding cannot be uniformly cured or molded, would not be suitably compact at the many boundary regions where portions molded at different times join, and would tend to be warped out of shape. It has also been proposed that the center slot receiving portion be molded in conventional manner in a clamping mold or press and that the end portions be bound in a tightly confining tape or material which may be wrapped around the winding periphery, in effect clamping the conductors together. Here again, it has been found that the pressure exerted by material wrapped around the winding, while it does serve generally to hold the conductors in place, is not sufficient for the final molding process and produces a poor product.

It is, therefore, an object of our invention to provide a method for fabricating an electrical winding in a hydraulic fluid under heat and pressure in which the hydraulic fluid is prevented from penetrating into the winding.

Briefly, our invention comprises the fabrication of an electrical winding in which the individual conductors of the winding are separated with a thermosetting material The exterior of the conductor array or bar, which may be covered by additional thermosetting material as in sheet, tape, or other form, is enclosed in a sealed film such as a sealed bag or bags or envelopes of a resinous sheet material which is pervious to vapor but impervious to liquid. Generally speaking, films from about two to eight mils thick are suitable for the present purpose with those about four mils thick preferred. The sealed assembly is treated under vacuum to expel any residual vapor within the envelope or winding and then submerged in a hot liquid under pressure whereby the thermosetting insulating material is cured and the winding bonded into a homogeneous unitary insulated structure. The velope is then stripped from the winding to obtain the finished product or one which may be further treated as desired.

The features of our invention which we believe to be novel are set forth with particularity in the claims appended hereto. Our invention itself, however, both as to its organization and method of operation, together with further objectives and advantages thereto, may best be understood from a consideration of the following description and the drawing in which Fig. 1 is a partial perspective view partially in cross section of a finished winding made according to our invention, and Fig. 2 is a cutaway view of a tank used to hydraulically treat and mold the winding.

Referring to Fig. 1, there is shown a typical cross section structure of a winding such as that which may be treated according to our invention. The winding 1 comprises a plurality of conductors or straps 2 of metals such as copper, aluminum, and the like, arranged in tiers spaced by a separator 3, which may typically be of a glass-asbestos, resin bonded composition, a cured phenolic resin, or other thermosetting material. Each conductor 2 is also typically insulated as with a thermosetting material 4 which may be applied in any usual way as by dipping, spraying, painting and the like. Thermosetting material 4 can be any number of adhesive resins well known to those skilled in the art, including but not limited to epoxy resins, polyesters, phenolics, silicones, and the like, or mixtures of such materials. This turn insulation 4 may also take the form of a tape such as of glass fiber or asbestos impregnated with any of these resins, the tape being wound in overlapping fashion over the conductor 2. Wrapped around the conductor assembly are one or more layers 5 of tape comprising a thermosetting material. Typical of such tapes are those described in Patent 2,707,205 to Richardson and Zavist, April 26, 1955, assigned to the same assignee as this application and our co-pending application, Serial No. 21,826, filed July 13, 1955, now Patent 2,789,155, also assigned to the same assignees as this application, wherein the tape is a composite tape of filled and cured silicone with a filled uncured adhesive silicone layer thereon.

When the conductor assembly has been assembled in its proper shape with an interconductor or turn insulation 4 and at least the preliminary layers of outer insulation, it is ready for cure of the turn insulation and the outer insulating layer if required. Because of the odd, generally dished and twisted longitudinal shape of the winding as best shown in Fig. 2, ready curing of the complete assembly presents a problem which as pointed out above is solved only by curing or molding in a pressurized and heated hydraulic fluid which with molding methods used thus far, has either been deliberately allowed to seep into the winding composition as a part of the insulation as in the case of molten asphalt bitumen or which has heretofore tended to so seep into the winding structure because no effective method has prior to our invention been provided for excluding it. According to our invention, we enclose the entire electrical winding, including the slot and end portions, in one or more bags of a relatively thin, vapor pervious, liquid impervious resinous material such as regenerated cellulose, polyvinyl alcohol, polyvinyl chloride, irradiated polyethylene and the like, which will permit the passage outwardly of vapors within the bag or envelope through the wall thereof but will not permit passage of the hot pressurized curing or molding liquid through the bag into the winding. We may use one bag to entirely enclose the whole winding, the open end of the bag being folded over a number of times or even knotted or heat sealed where practicable to prevent the ingress of liquid. The entire winding is then preferably wrapped in a sacrifice tape such as of cotton which aids in holding the conductors in their assembled position and presses the bag firmly against the conductor assembly to provide a smooth outer surface to which heat and pressure is applied. Alternatively, of course, we may use two bags of resinous material, one being placed over the winding from either end with the open ends arranged in overlapping fashion which may then be folded or otherwise sealed to prevent passage of liquid. In this case, a sacrifice tape is also applied to the assembly.

The winding is now ready for the actual molding or curing process and is transferred to a pressure tank 8 shown in Fig. 2. This tank may be designed to receive a number of windings in either horizontal or vertical fashion as shown. The tank is provided with a pressure and vacuum sealable cover 9 and with a conduit 10 leading to a vacuum pump 11 and a pressure source 12, either of which may be connected to the tank by means of valves 13 and 14. There is also provided a conduit 15 in the bottom of the tank provided with a valve 16 which leads to a hydraulic liquid supply not shown which may be used to fill the tank.

The winding 1 is supported in tank 8 by any convenient means, not shown, and, with the cover 9 in place, the tank is evacuated by means of vacuum pump 11 and heated to a temperature of about 60° by means, not shown, for about six hours. During this period, any residual vaporizable material within the conductor structure or the tape surrounding it, is vaporized and passes outwardly through the resin envelope and sacrifice tape into the tank where it is removed by the vacuum pump. It will be realized, of course, that this evacuation procedure or vacuum treatment is of a time-temperature nature and those skilled in the art will adjust this treatment cycle to the particular needs of the material which they are using. It has been found generally, however, that with the particular materials mentioned above, treatment at the above temperature and for the time mentioned, is usually sufficient. After the vacuum treatment, the heated hydraulic fluid is fed into the tank preferably with the vacuum pump 11 still in operation until the liquid covers the entire winding at which time the vacuum pump 11 is shut off and pressure source 12 is actuated and connected to the tank by open valve 13. Pressure source 12 may conveniently utilize nitrogen, carbon dioxide, helium, or any other non-reactive gas and the pressure is so regulated as to exert a pressure of about 100 pounds per square inch on the liquid in the tank and hence upon all sides of the winding 1. The temperature of the liquid is preferably maintained at a temperature of about 150° C., although of course it will be realized, that this temperature will vary with the particular resins used as will the time of cure which with the temperature of 150° is preferably about six hours. During this time any resinous insulation between the conductors or straps within the winding assembly is cured to a substantially infusible, insoluble thermoset state which is uniform in character both in the slot portion 6 and the end portions 7 of the winding. Likewise, the resinous outer insulation is also cured into a smooth continuous unitary structure which is tough and compact. After the cure has been completed, the winding 1 is removed from the tank and the outer sacrifice tape and resin bag stripped therefrom to provide a finished winding, or one which may be covered with further insulation which is also cured in the above manner.

It will be seen that we have provided by our invention, a procedure whereby windings for electrodynamic machinery may be readily cured and molded in a uniform, homogeneous manner by means of a heated and pressurized hydraulic fluid without contaminating the winding with the hydraulic fluid.

What we claim as new and desire to secure by Letters Patent of the United States is:

1. The method of molding an elongated electrical winding having insulation comprising a thermosetting material, which method comprises enclosing said winding in a sealed bag of resinous material which is pervious to vapor and impervious to liquid, enclosing said bag in a porous confining covering, placing said winding in a chamber, creating a vacuum in said chamber to evacuate residual vapor from within said winding through the walls of said bag, relieving said vacuum, introducing a liquid into said chamber and heating and applying pressure to said liquid to cure the thermosetting resin in said winding, removing said winding from said liquid and removing said porous covering and bag.

2. The method of molding an elongated electrical winding having insulation comprising a thermosetting material, which method comprises enclosing said winding in a sealed bag of resinous material which is pervious to vapor and impervious to liquid, placing said covered winding in a chamber, producing a vacuum in said chamber to evacuate residual vapor from within said winding through the walls of said bag, releasing said vacuum, introducing a liquid into said chamber, and heating and applying pressure to said liquid to cure the thermosetting resin in said winding.

3. The process of molding an elongated electrical member having an insulation thereon comprising a thermosetting material, which method comprises enclosing said member in a sealed bag of resinous material which is pervious to vapor and impervious to liquid, enclosing said bag in a porous confining covering, placing said member in a chamber, producing a vacuum in said chamber to evacuate residual vapor from within said member through the walls of said bag, relieving said uum, introducing a liquid into said chamber, and h ing and applying a pressure to said liquid to cure thermosetting resin in said winding, removing said m ber from said liquid, and removing said porous co ing and bag.

4. A method of molding an elongated electrical m ber having insulation thereon comprising a thermoset material, which method comprises enclosing said m ber in a sealed bag of resinous material which is pervi to vapor and impervious to liquid, placing said w ing in a chamber, creating a vacuum in said cham to evacuate residual vapor from within said mem through the walls of said bag, relieving said vacuum, troducing a liquid into said chamber, and heating applying pressure to said liquid to cure the thermoset resin in said winding.

References Cited in the file of this patent

UNITED STATES PATENTS

| | | |
|---|---|---|
| 2,374,040 | Ryan | Apr. 17, 1! |
| 2,550,453 | Coggeshall | Apr. 24, 1! |
| 2,601,243 | Botts et al. | June 24, 1! |
| 2,783,171 | Thiessen | Feb. 26, 1! |

FOREIGN PATENTS

| | | |
|---|---|---|
| 599,617 | Great Britain | Mar. 17, 1! |